United States Patent
Janger et al.

(10) Patent No.: US 11,795,808 B2
(45) Date of Patent: *Oct. 24, 2023

(54) DYNAMIC POWER OPTIMIZATION SYSTEM AND METHOD FOR ELECTRIC SUBMERSIBLE MOTORS

(71) Applicant: Halliburton Energy Services, Inc., Houston, TX (US)

(72) Inventors: Luke Golden Janger, Tulsa, OK (US); Ryan Bridwell Ashbaugh, Broken Arrow, OK (US); David Linn Self, Soso, MS (US); Wesley John Nowitzki, Tulsa, OK (US); David C. Beck, Broken Arrow, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,868

(22) Filed: Feb. 6, 2023

(65) Prior Publication Data
US 2023/0184071 A1  Jun. 15, 2023

Related U.S. Application Data

(62) Division of application No. 17/862,608, filed on Jul. 12, 2022, now Pat. No. 11,613,974, which is a
(Continued)

(51) Int. Cl.
*E21B 43/12* (2006.01)
*H02K 11/215* (2016.01)
(Continued)

(52) U.S. Cl.
CPC .......... *E21B 47/008* (2020.05); *E21B 43/128* (2013.01); *F04D 13/10* (2013.01);
(Continued)

(58) Field of Classification Search
CPC .. F04D 13/10; F04D 15/0066; F04D 15/0088; F04D 13/086; F04D 15/0027;
(Continued)

(56) References Cited

U.S. PATENT DOCUMENTS 6,167,965 B1 * 1/2001 Bearden .............. F04D 15/0088
  417/18
9,998,054 B1 * 6/2018 Yohanan ............... H02P 27/047
(Continued)

FOREIGN PATENT DOCUMENTS

CN     201118511       9/2008
WO     2015164681 A1   10/2015
(Continued)

OTHER PUBLICATIONS

"CO Application No. NC2019/0005516, Second Office Action", dated Nov. 9, 2022, 10 pages.
(Continued)

*Primary Examiner* — Dominick L Plakkoottam
(74) *Attorney, Agent, or Firm* — DELIZIO, PEACOCK, LEWIN & GUERRA

(57) ABSTRACT

A method comprises operating an electric submersible pump (ESP) motor downhole in a well. The ESP motor is electrically connected to a variable speed drive (VSD) proximate to the well. The operating comprises measuring a revolution rate and a motor current of the ESP motor for a first period of time and performing a first adjustment of a voltage output of the VSD. The method comprises measuring, after the first adjustment, the revolution rate and the motor current of the ESP motor for a second period of time determining a difference between the motor current measured for the first
(Continued)

period of time and the motor current measured for the second period of time; and performing a second adjustment of the voltage output of the VSD based on a change in the revolution rate and the motor current between the first period of time and the second period of time.

20 Claims, 4 Drawing Sheets

Related U.S. Application Data division of application No. 16/486,771, filed as application No. PCT/US2018/012627 on Jan. 5, 2018, now Pat. No. 11,414,967.

(60) Provisional application No. 62/442,819, filed on Jan. 5, 2017.

(51) Int. Cl.
*H02P 6/28* (2016.01)
*F04D 25/06* (2006.01)
*H02K 5/132* (2006.01)
*F04D 13/10* (2006.01)
*F04D 15/00* (2006.01)
*E21B 47/008* (2012.01)

(52) U.S. Cl.
CPC ..... *F04D 15/0066* (2013.01); *F04D 25/0686* (2013.01); *H02K 5/132* (2013.01); *H02K 11/215* (2016.01); *H02P 6/28* (2016.02)

(58) Field of Classification Search
CPC .... F04D 25/0686; F04D 9/002; E21B 43/128; E21B 47/008; E21B 41/0092; E21B 43/121; H02K 5/132; H02P 21/00; H02P 27/045; H02P 3/00; H02P 6/28
See application file for complete search history.

(56) References Cited

U.S. PATENT DOCUMENTS

| | | | |
|---|---|---|---|
| 10,408,208 B2* | 9/2019 | Williams | F04B 17/03 |
| 11,414,967 B2* | 8/2022 | Janger | H02K 5/132 |
| 11,613,974 B2* | 3/2023 | Janger | F04D 13/10 |
| | | | 417/423.3 |
| 2008/0247880 A1* | 10/2008 | Leuthen | F04D 15/0066 |
| | | | 417/44.11 |
| 2009/0044938 A1* | 2/2009 | Crossley | G05B 17/02 |
| | | | 166/250.15 |
| 2009/0250210 A1* | 10/2009 | Allen | F04D 15/0209 |
| | | | 702/6 |
| 2010/0155057 A1* | 6/2010 | Atherton | G01R 29/16 |
| | | | 166/250.01 |
| 2011/0050144 A1* | 3/2011 | Knox | E21B 47/008 |
| | | | 318/490 |
| 2016/0084254 A1* | 3/2016 | Dowling | E21B 43/128 |
| | | | 417/44.2 |
| 2016/0215601 A1* | 7/2016 | Knapp | E21B 43/128 |
| 2016/0215769 A1* | 7/2016 | Haapanen | E21B 43/128 |
| 2017/0045055 A1* | 2/2017 | Hoefel | H02K 5/132 |
| 2017/0138159 A1* | 5/2017 | Hoyte | E21B 43/128 |
| 2017/0363088 A1* | 12/2017 | Nguyen | E21B 47/008 |
| 2021/0140289 A1* | 5/2021 | Janger | E21B 43/128 |
| 2022/0341300 A1 | 10/2022 | Janger et al. | |

FOREIGN PATENT DOCUMENTS

| | | | | |
|---|---|---|---|---|
| WO | 2016036342 | | 3/2016 | |
| WO | WO-2016036342 A1 * | | 3/2016 | E21B 43/12 |
| WO | 2017160290 | | 9/2017 | |
| WO | WO-2017160290 A1 * | | 9/2017 | |

OTHER PUBLICATIONS

"CO Application No. NC2019/0005516 Office Action", dated Aug. 5, 2022, 18 pages.
PCT Application Serial No. PCT/US2018/012627, International Search Report, dated Apr. 18, 2018, 3 pages.
PCT Application Serial No. PCT/US2018/012627, International Written Opinion, dated Apr. 18, 2018, 5 pages.

* cited by examiner

DYNAMIC POWER OPTIMIZATION SYSTEM AND METHOD FOR ELECTRIC SUBMERSIBLE MOTORS

BACKGROUND

Field of the Invention

Embodiments of the invention described herein pertain to the field of electric submersible motors driven by a variable speed drive. More particularly, but not by way of limitation, one or more embodiments of the invention enable a dynamic power optimization system and method for electric submersible motors.

Description of the Related Art

Fluid, such as natural gas, oil or water, is often located in underground formations. When pressure within the well is not enough to force fluid out of the well the fluid must be pumped to the surface so that it can be collected, separated, refined, distributed and/or sold. Centrifugal pumps are typically used in electric submersible pump (ESP) applications for lifting well fluid to the surface. Centrifugal pumps accelerate a working fluid through a rotating impeller, which is driven by a rotating pump shaft and paired with a stationary diffuser. In multistage centrifugal pumps, multiple impeller and diffuser stages are stacked around the pump shaft, with each successive impeller sitting on a diffuser of the previous stage. The pump shaft runs longitudinally through the center of the stacked pump stages.

Typically, rotation of the pump shaft is powered by an electrical motor located on the upstream side of the pump assembly. The motor is typically a two-pole, three-phase squirrel cage induction motor that includes a rotating motor shaft. The ESP power source is conventionally located at the surface of the well and is connected to the motor by insulated electrical conductors, which extend alongside the ESP assembly down into the wellbore. These power cables are often thousands of feet long in deep wells, for example up to 5,000-8,000 feet.

The motor is typically driven by a variable speed drive (VSD) near the surface of the well in which the ESP string resides. The VSD varies the speed of the motor by adjusting the supply frequency. In general, motor speed is conventionally controlled by adjusting the frequency output of the VSD, often measured in revolutions per minute (rpm), to accommodate different performance requirements. Conventional VSDs adjust voltage and frequency proportionally such that the ratio between the two, often expressed as volts-per-Hertz (V/Hz), stays constant despite changes to the motor speed. When the voltage changes, the power output of the VSD, and therefore the power consumed to run the motor during operation, is also altered. Power is proportional to the speed of the motor, as well as the output voltage, such that even if the V/Hz ratio stays constant, the power consumed by the motor will change dynamically whenever the VSD changes the motor's speed. The power required as a result of such changes is of particular interest in the field of electric submersible motors since power usage is often the primary operating cost in ESP applications.

During the manufacturing process, motors used in ESP and other centrifugal pump applications are given a power rating and operating specifications to accommodate the environmental and operational conditions expected for the motor, and to provide a basis for efficient use by an operator in the field. This is often accomplished using a dynamometer and allows a rating, which is often expressed as a percentage of the nameplate power, for example percent horsepower (HP) or percent load. High temperature conditions, for example, may require a de-rating of the motor to prevent overheating, which requires the motor to operate below nameplate power. Additionally, these tests often include a best efficiency point (BEP) of the motor at a given load as well as operating efficiency curves, which provide, for example, voltage values that may minimize the current, and therefore power, consumed by the motor. These tests may provide operators with operating guidelines for a given motor that provide for more efficient operation under different operating conditions.

A problem that arises is due to discrepancies between the operating guidelines for a motor's optimal efficiency, which are obtained in a laboratory, and actual downhole operating conditions. Once the motor has been applied in the field, environmental conditions—such as temperatures and gas-content in the well—change over the course of operation. Since the motor's rating and BEP do not account for such unexpected changes, the motor typically operates inefficiently, which may contribute to larger operating costs. Further, a voltage drop is likely to occur across the length of the extremely long electrical cable that connects the motor to the VSD. This voltage drop is similarly unpredictable since it is a function of the cable's length, age, manufacturer, and temperature gradients along the cable's length. This unpredictability prevents an operator from knowing how much of the VSD's power output will actually reach the motor, which increases the likelihood of inefficient power use of the motor and VSD.

Additionally, conventional ESP motors are prone to overvoltage, which occurs when the VSD is supplying more voltage, and therefore more horsepower, than the motor actually requires. This results in the motor drawing only as much current as needed, and causing the remainder of the VSD power output to be used inefficiently or wasted. Operating under such conditions can contribute further to the power use of the system and increase the operating costs of the ESP assembly. Manufacturer tests conducted to ascertain the rating and BEP of a motor are often unable to predict some, or any, of the environmental and operating conditions experienced by a motor that is operating downhole in a well, such as an oil well. Further, since the system is dynamic and difficult to predict, changing the speed of the VSD will often result in inefficient power use since the power required to be sent to the motor is likely to diverge from the manufacturer's predictive model.

It has been proposed to account for the effect of variations in environmental and operational conditions of the ESP motor by manually monitoring the motor from the VSD. However, this would require twenty-four hour, seven day a week attention by an operator in order to accommodate changing conditions (such as temperature and/or gas composition) and to update operating models. Such a procedure would not only be infeasible due to the man hours required from an operator and the frequency with which operating inputs may need to be updated, but may also require the system to be shut down regularly to monitor and change certain variables in a trial and error process, which would further contribute to the cost of running the ESP assembly.

As is apparent from the above, currently available ESP motors suffer from inefficient power usage. Therefore, there is a need for an improved system and method of dynamically optimizing power usage for an electric submersible motor during downhole operation.

SUMMARY

One or more embodiments of the invention enable a dynamic power optimization system and method for electric submersible motors.

A dynamic power optimization system and method for electric submersible motors is described. An illustrative embodiment of a system to optimize operation of an electric submersible pump (ESP) motor includes the ESP motor electrically coupled to a variable speed drive (VSD) that outputs voltage to the ESP motor, the VSD controlled by a VSD controller including a computer with non-transitory memory storage, and wherein the non-transitory memory storage stores instructions which, when executed by the computer cause the following steps to be performed dynamically in a loop during operation of the VSD and ESP motor: obtaining a measurement of at least one pump performance variable and a motor current for a first period of time to establish a first data set, making a first adjustment to a voltage output from the VSD to the ESP motor, the first adjustment having a first adjustment type, wherein the first adjustment type is one of increasing or decreasing the voltage output, sensing the at least one pump performance variable and the motor current for a second period of time, after the motor voltage adjustment, to establish a second data set, differencing the first data set with the second data set to determine a change in the motor current from the first data set to the second data set, and making a second adjustment to the voltage output from the VSD to the ESP motor in response to the change in motor current and a change in the at least one pump performance variable, the second adjustment including one of: an adjustment of the first adjustment type if the change in current is a drop and the at least one pump performance variable in the second data set is maintained between an upper threshold and a lower threshold, or an adjustment opposite the first adjustment type if one of: the change in current is a rise and the at least one pump performance variable in the second data set is maintained between the upper threshold and the lower threshold, or if the change in current is a drop and the at least one pump performance variable in the second data set deviates one of above the upper threshold or below the lower threshold. In some embodiments, the system further includes a magnet on a shaft of the ESP motor and a downhole sensor coupled to the magnet, wherein the downhole sensor measures a magnetic flux of the magnet, wherein the at least one pump performance variable includes revolution rate of the shaft of the ESP motor. In certain embodiments, the at least one pump performance variable includes discharge pressure and the upper threshold and the lower threshold are at least partially defined based on a pump head-flow curve. In some embodiments, the at least one pump performance variable includes one of ESP pump discharge pressure, ESP pump intake pressure, revolution rate of the ESP motor, or a combination thereof. In certain embodiments, the ESP motor is downhole in a well, and the VSD is proximate to a surface of the well. In some embodiments, the motor current is measured using an ammeter one of at the ESP motor, at the output of the VSD, intermediately along an ESP power cable extending between the ESP motor and the VSD, or a combination thereof. In certain embodiments, the voltage output from the VSD to the ESP motor is adjusted in a variable increment determined by the computer of the VSD controller. In some embodiments, the increment of voltage adjustment is between 0.5 Volts and 20.0 Volts inclusive and a step size of the increment is dynamic. In some embodiments, the computer is a programmable logic controller including software in ladder-logic and includes a user interface. In certain embodiments, the loop continues iteratively until operation of the ESP motor ceases. In some embodiments, a computer-readable medium storing instructions which, when executed by a processor, causes the loop to be carried out. In certain embodiments, an electric submersible pump (ESP) motor and variable speed drive (VSD) in combination with a memory storage device storing program instructions operative, when implemented by a processor, to cause the processor to perform the steps of the loop.

An illustrative embodiment of a computer-implemented method of power optimization for an electric submersible (ESP) motor includes operating the ESP motor downhole in a well, the ESP motor electrically connected to a variable speed drive (VSD) proximate to the well, the variable speed drive outputting voltage to the ESP motor and at least partially controlled by a programmable logic controller (PLC) with non-transitory memory storage, storing instructions which, when executed by the computer, cause following steps to be performed dynamically in a loop: reading a revolution rate of the ESP motor using a magnet attached to a shaft of the ESP motor and measuring a motor current, for a first period of time to establish a first data set, making a first adjustment to a voltage output from the VSD to the ESP motor, the first adjustment having a first adjustment type, wherein the first adjustment type is one of increasing or decreasing the voltage output, sensing the revolution rate and the motor current for a second period of time, after the motor voltage adjustment, to establish a second data set, differencing the first data set with the second data set to determine a change in the motor current from the first data set to the second data set, and making a second adjustment to the voltage output from the VSD to the ESP motor in response to the change in motor current and a change in the revolution rate, the second adjustment including one of: an adjustment of the first adjustment type if the change in current is a drop and the revolution rate in the second data set is maintained between an upper threshold and a lower threshold, or an adjustment opposite the first adjustment type if one of: the change in current is a rise and the revolution rate in the second data set is maintained between the upper threshold and the lower threshold, or if the change in current is a drop and the revolution rate in the second data set deviates one of above the upper threshold or below the lower threshold. In some embodiments, sensing the revolution rate of the ESP motor includes measuring a magnetic flux of the shaft of the motor as it rotates. In certain embodiments, the magnetic flux of the shaft is measured using a downhole sensor coupled below the motor, the downhole sensor measuring the magnetic flux of the magnet attached to the shaft. In some embodiments, the method further includes calculating power usage of the ESP motor from measured motor current and the voltage output to the motor and logging the power usage so calculated. In certain embodiments, the loop is repeated iteratively during operation of the ESP motor. In some embodiments, the voltage output to the motor is adjusted and changed in increments of between 0.5 Volts and 20.0 Volts inclusive. In certain embodiments, the voltage output to the motor is adjusted every five minutes. In certain embodiments, a size of the increment is dynamically changed during iterations of the loop. In some embodiments, the method further includes logging the adjustments in the direction of the motor voltage output to the ESP motor.

In certain embodiments, a computer-readable medium storing instructions which, when executed by a processor, cause the method to be carried out. In some embodiments, an electric submersible pump (ESP) motor and variable speed drive (VSD) in combination with a memory storage device storing program instructions operative, when implemented by a processor, to cause the processor to perform the steps of the method.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings in which.

Figure 1A:
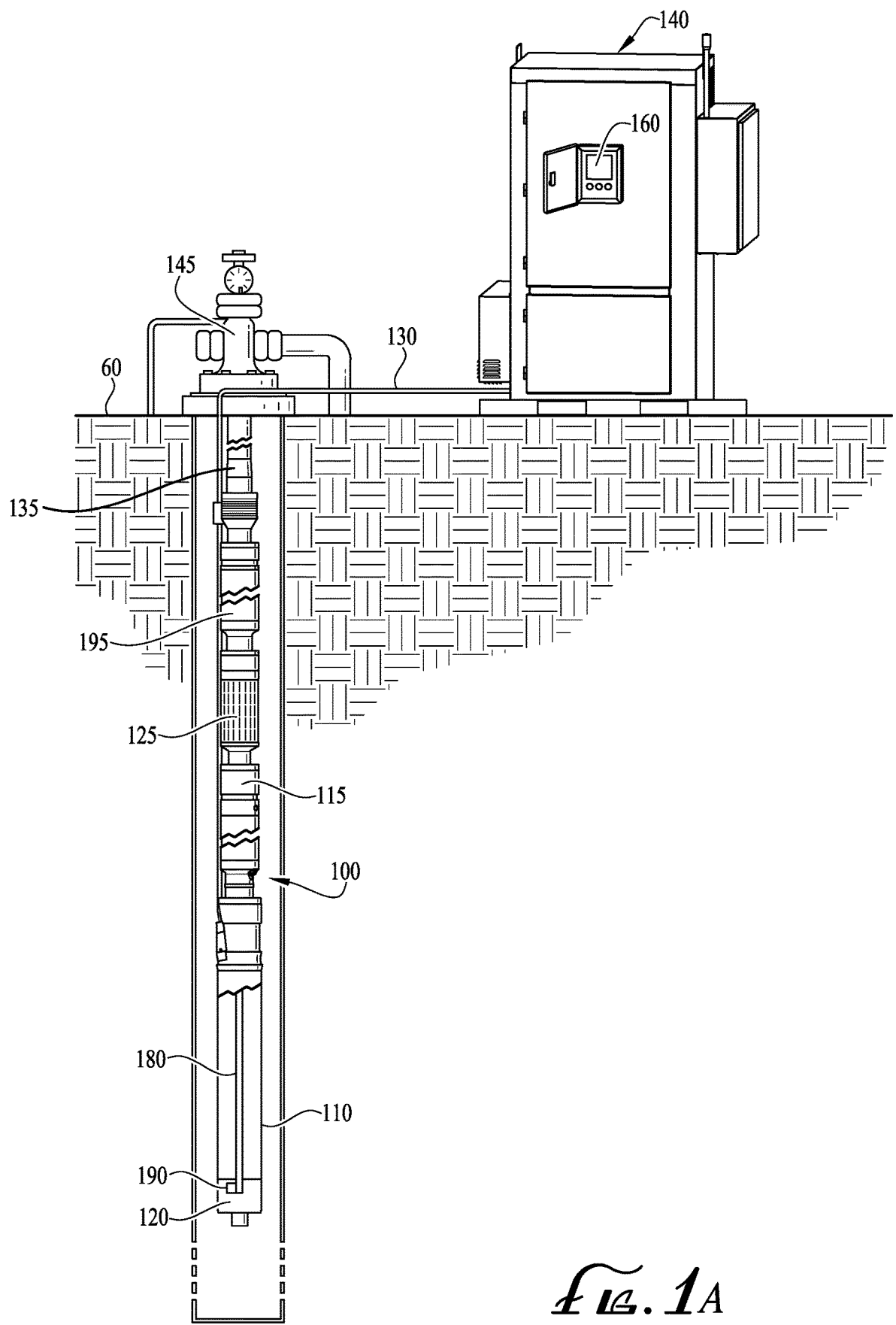
FIGS. 1A-1B are perspective views of an electric submersible pump assembly of an illustrative embodiment controlled by a variable speed drive (VSD) system of an illustrative embodiment.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives falling within the scope of the present invention as defined by the appended claims.

DETAILED DESCRIPTION

A dynamic power optimization system and method for electric submersible motors is described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a sensor includes one or more sensors.

"Downstream" refers to the longitudinal direction substantially with the principal flow of lifted fluid when the pump assembly is in operation. By way of example but not limitation, in a vertical downhole electric submersible pump (ESP) assembly, the downstream direction may be towards the surface of the well.

"Upstream" refers to the longitudinal direction substantially opposite the principal flow of lifted fluid when the pump assembly is in operation. By way of example but not limitation, in a vertical downhole ESP assembly, the upstream direction may be opposite the surface of the well.

As used in this specification and the appended claims, "increase" or "rises" with respect to revolution rate of a motor shaft refers to the change in magnitude of the revolution rate, and in the interests of not obscuring the invention, assumes that the direction of rotation of the motor shaft does not change during the voltage adjustments of illustrative embodiments. "Increase" or "rises" with respect to current similarly refers to the change in magnitude of the absolute value of the current.

As used in this specification and the appended claims, "decrease" or "drops" with respect to revolution rate of a motor shaft refers to the change in magnitude of the revolution rate, and in the interests of not obscuring the invention, assumes that the direction of rotation of the motor shaft does not change during the voltage adjustments of illustrative embodiments. "Decrease" or "drops" with respect to current similarly refers to the change in magnitude of the absolute value of the current.

As used in this specification and the appended claims, a change in current is "negligible" as determined by the convergence threshold parameter of an optimization algorithm of illustrative embodiments.

As used herein, a voltage adjustment refers to increasing or decreasing the magnitude of the voltage without changing the polarity of the voltage.

As used herein, current is sometimes used as a proxy for power, since in electrical circuits, power is proportional to current. Motor power may also be calculated using motor electrical and/or mechanical readings and the motor's power factor and efficiency characteristics.

Illustrative embodiments are described in terms of an electric submersible motor employed in an ESP assembly deployed downhole in a well, the motor driven by a variable speed drive (VSD) including a VSD controller user interface. However, the invention is not so limited and may be applied to any VSD operated electric motor using power in a manner that varies from the expected power rating, for example motors operating under high temperatures or employing power cables hundreds or thousands of feet long. By way of example but not limitation, the method of illustrative embodiment may be applied to a horizontal pump motor and motors driving axial-flow pumps, horizontal-flow pumps, mixed-flow pumps or machines other than pumps.

Illustrative embodiments may improve the operation of an ESP string by minimizing power consumption of the ESP motor in a manner that does not significantly affect pump performance, for example without affecting the amount of fluid that can be pumped and/or the amount of lift generated. Illustrative embodiments may use one or more metric of pump performance such as operating speed of the motor (revolution rate of the motor shaft), flow rate through the pump, discharge pressure and/or intake pressure as a gauge for pump performance. The method of illustrative embodiments may improve the submersible motor and/or ESP assembly operation as a whole by minimizing the power consumption of the ESP motor during operation, which may provide for a "green" ESP motor. In some cases, the power savings may be up to 25%, which may reduce the cost to operate the ESP assembly and be environmentally friendlier than conventional ESP motor operation. The method of illustrative embodiments may allow the VSD computer and/or submersible motor to dynamically adapt the system's power usage to changing environmental and/or operational conditions downhole. The method of illustrative embodiments may improve over conventional systems by preventing the need for system shut-down in order to adjust power usage of the system, which may save time and/or reduce operating expenses of running the ESP assembly. Illustrative embodiments may also improve operation of the VSD system itself by improving the VSD's ability to dynamically and efficiently control the ESP motor.

The computer-implemented method of illustrative embodiments may be executed by VSD controller user-interface software and/or software executed by a VSD controller PLC or computer having a processor and memory storage device. Illustrative embodiments may create updated data sets in iterations, which datasets may originate from downhole measurements, measurements indicative of pump performance, change in current and/or measurements of the VSD output voltage, stored by the computer system for analysis. The computer system of illustrative embodiments may compare and/or difference the data both before and after an adjustment of voltage output from the drive to the motor. Based on the differencing between data sets and/or comparing the data sets to threshold limits, illustrative embodiments may determine the type of further adjustment that may be needed (either increase or decrease) so as to minimize current and therefore optimize power usage of the ESP motor, while maintaining ESP assembly performance. The method of illustrative embodiments may be repeated at intervals in a feedback loop to ensure optimal power usage despite changing ambient conditions experienced by the ESP motor.

VSDs, also called variable-frequency drives, adjustable frequency drives, AC drives, micro drives or inverter drives, are types of adjustable speed drives, well known to those of skill in the art, used in electro-mechanical drive systems to control AC motor speed and torque by varying motor input frequency and voltage. VSDs are used in many different applications, from small appliances to pumping applications including electric submersible pumps. Referring to FIG. 1B, a VSD system of illustrative embodiments may include three main sub-systems: AC motor 110, VSD (main drive or slice) 300 and controller 305. AC motor 110 may be a three-phase induction motor. VSD main drive 300 may be a solid-state power electronics conversion system. An embedded microprocessor control system such as slice panel interface 315 may be implemented as firmware and may provide lower-level configuration and control. Controller 305 may be a programmable logic controller (PLC) that may be written in ladder logic and include user interface 160 (shown in FIG. 1A). Controller 305 may output information and display the information on user interface 160. User interface 160 may provide and/or receive and convey instructions to VSD controller 305 and may also provide control options to a user or operator of VSD main drive 300. User interface 160 may be used to review and revise settings and operational parameters for VSD 300. VSD controller user interface 160 may include a color and/or a monochrome output display, and well as a user input interface, such as a touch screen, keyboard, switches, buttons and/or mouse to allow the user, or the computer to be programmed, to input operations parameters. The computer systems of illustrative embodiments may include hardware, software, a processor, non-transitory memory and/or storage, as is well known to those of skill in the art.

Figure 1B:
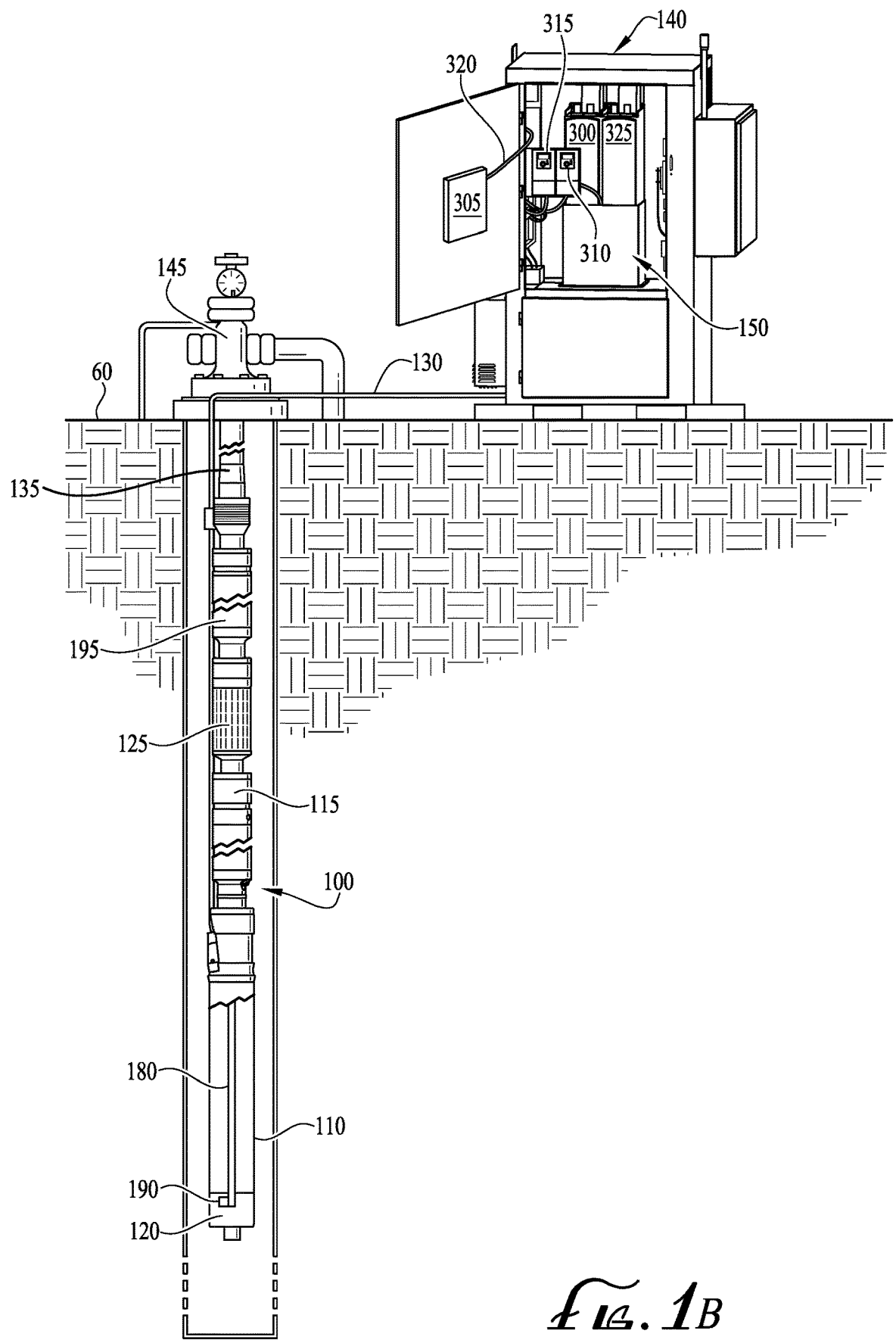

FIG. 1A and FIG. 1B illustrate VSD cabinet 140 of an illustrative embodiment that may house VSD system 150 at, near and/or proximate surface 60 of an underground formation. As shown in FIG. 1B, VSD 300 may include slice panel interface 315 and when an active front end (AFE) is included, AFE 325 may include AFE panel interface 310. Slice panel interface 315 and/or AFE panel interfaces 310 may provide lower-level configuration and control. Controller 305 may have network communications path 320 into VSD 300 to provide monitoring, command and control functions of the overall operation of VSD 300 at a high level. Controller 305 may include graphical user interface 160 that is accessible from the outside of cabinet 140 when the door to cabinet 140 is closed. FIG. 1A illustrates the graphical user interface 160 of controller 305, accessible from outside cabinet 140.

VSD system 150 may be informationally coupled to ESP power cable 130 that, in addition to providing power to ESP motor 110, may also be coupled to VSD system 150 and carry information from downhole gauges 120 (sensors) to VSD system 150. In some embodiments, information from downhole gauges 120 may be transmitted on a dedicated cable separate from and/or bundled with ESP power cable 130. ESP assembly 100 may be located in a downhole well and include ESP pump 195, which may for example be a multi-stage centrifugal pump that lifts oil, natural gas and/or water to the surface of the underground formation using stacked impeller and diffuser stages. Motor 110 may be a two-pole, three-phase squirrel cage induction motor below and/or upstream of ESP pump 195 that operates to turn pump 195. ESP assembly 100 may also include seal section 115 that may protect motor 110 from ingress of well fluid and may equalize pressure inside motor 110. Intake 125 may serve as the intake for fluid into ESP pump 115. Production tubing 135 may carry lifted well fluid to surface 60 of the well through wellhead 145.

Downhole gauge 120 may measure, for example, information such as motor revolution rate, discharge pressure, vibration in one, two, or three axes, intake pressure, gauge temperature, and/or other variables indicative of pump performance, power usage and/or otherwise of interest. Pump flow rate may be inferred from differential pressures when discharge pressure transducer 335 (shown in FIG. 3) is included. Motor voltages and power consumption may be measured at surface 60 by VSD system 150 and motor 110 efficiencies may be calculated from the measurements obtained. Cabinet 140 may house VSD (main drive) 300 and controller 305, which controller 305 may be a PLC and/or computer. Controller 305 may be written in ladder-logic and include user interface 160. Software for user interface 160 functions may be integrated into the computer program of illustrative embodiments and may, for example, be employed to turn on and off ESP motor 110.

Adjustments to the voltage of power transmitted along power cable 130 to motor 110 may have the effect of changing the revolution rate of motor shaft 180 and/or motor 110. Cable 130 or another dedicated cable or wire may also relay measurements from downhole sensors 120 and/or shaft sensor 190 to VSD system 150 on well surface 60. Motor shaft sensor 190 may be placed on motor shaft 180 and may directly measure the revolution rate of motor 110. In some embodiments shaft sensor 190 may be a magnet attached to the bottom of motor shaft 180. The portion of motor shaft 180 including magnet sensor 190 may extend into downhole gauge (sensor) 120. Downhole sensors 120 may measure the magnetic flux of the magnet of shaft sensor 180, providing revolution rate data of motor shaft 180, which may be measured in revolutions per minute (rpm). Measurements sent from shaft sensor 190 and/or downhole sensors 120 may be transmitted along power cable 130 and/or a dedicated wire and supplied to controller 305 as an input. Such measurements may include motor revolution rate, motor current, motor speed, discharge pressure, intake pressure, pump flow rate and/or other variables that are indicative of motor 110 power consumption and performance of ESP assembly 100. Controller 305 may adjust and track the voltage that VSD 300 supplies to motor 110. Ammeter 330 (shown in FIG. 3) may measure current along power cable 130, at surface 60 proximate VSD 300, proximate motor 110, at motor 110 and/or intermediately along the length of power cable 130. Discharge pressure and/or intake pressure may be measured using pressure transducer 335. When pressure is measured at the pump intake, downhole sensors 120 including a submersible pressure transducer 335 at the bottom of motor 110 may be employed. When discharge pressure is measured, a pressure transducer 335 at wellhead 145 may be employed.

A power optimization method of illustrative embodiments includes adjusting and monitoring VSD 300 voltage output to motor 110 while tracking the resulting change in motor shaft 180 revolution rate and/or other variables indicative of motor horsepower and/or power efficiency. Power consumption of the ESP motor 110 may be thus be optimized by dynamically adjusting VSD 300 output frequency and/or voltage in the direction determined to optimize power use of ESP motor 110. In the example shown in FIGS. 1A-1B, this may include adjusting the voltage supplied by VSD system 150 to downhole motor 110, while monitoring the resulting change in motor 110 revolution rate, current and/or other variables indicative of ESP motor 110's power efficiency and/or pump 195 performance, for example discharge pressure, intake pressure and/or flow rate. Illustrative embodiments provide for dynamic adjustment of VSD 300 output variables in the direction determined to optimize power consumption at a given motor speed. The method of illustrative embodiments may use inputs taken from ammeters 330, downhole sensors 120, sensors at the wellhead 145 and/or shaft sensor 190, which may provide information regarding motor 110 horsepower output and/or pump performance. Illustrative embodiments may employ data sets of such collected information to calculate the appropriate motor voltage to optimize power usage under environmental and cable conditions actually experienced by ESP motor 110 during operation. The method of illustrative embodiments may be implemented for the duration of operation of motor 110.

Figure 2:
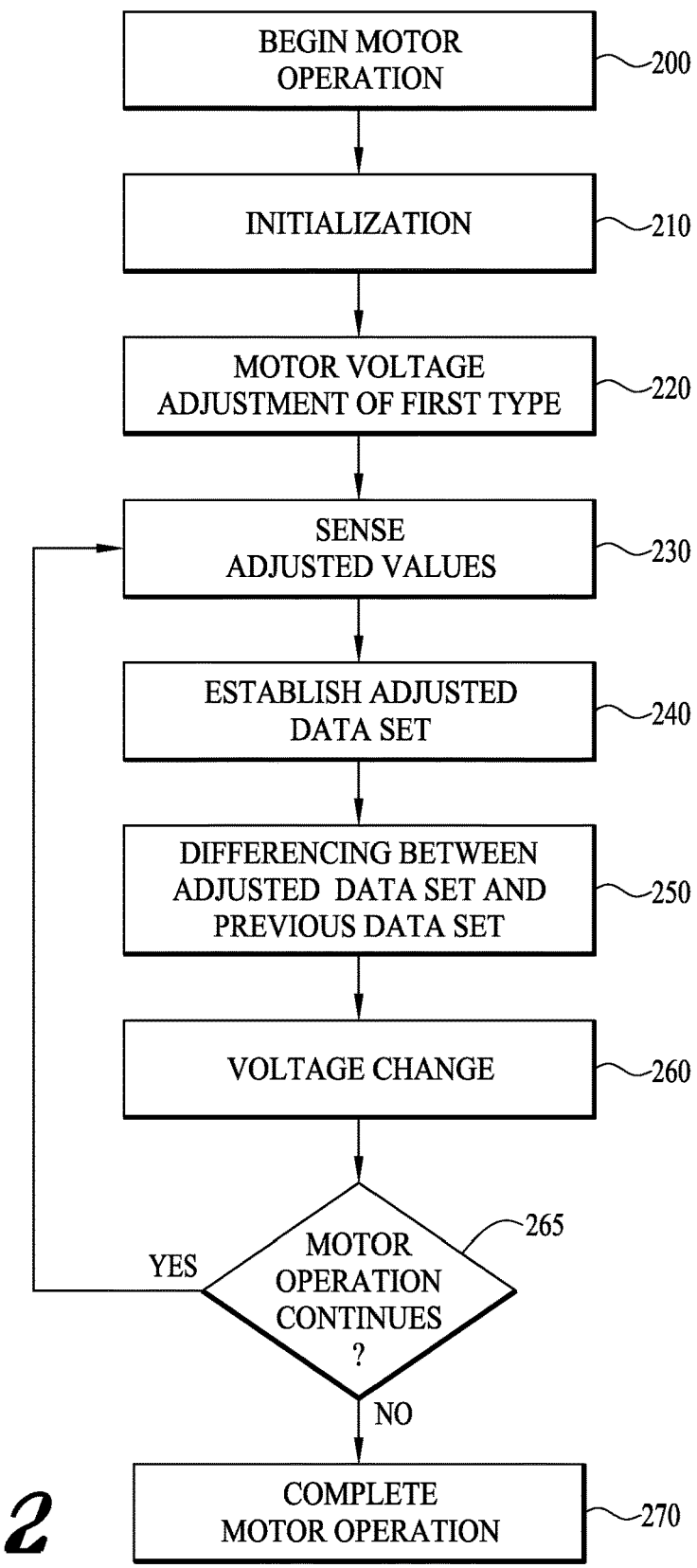
FIG. 2 is a flowchart diagram of a power optimization method of illustrative embodiments for use with an exemplary electric submersible motor controlled by a variable speed drive controller of illustrative embodiments.

FIG. 2 illustrates a dynamic power optimization loop of illustrative embodiments, which may be employed as a power optimization method for an exemplary downhole electric submersible motor operating to turn a multi-stage centrifugal pump. The method may be implemented by a computer and/or PLC included in VSD controller 305 that may include user interface 160 and be coupled to motor 110, as described herein. At motor operation step 200, operation of motor 110 may be initiated, for example by an operator selecting the appropriate button on VSD controller user-interface 160. Motor 110 may be operated downhole in a well and controlled by VSD controller 305 operatively coupled to VSD controller user interface 160.

At initialization step 210, variables of interest to power consumption of motor 110 and/or pump performance may be determined, assessed, measured and/or stored in an initial data set. In one example, revolution rate of motor 110 may be assessed as a function of VSD 300 output voltage sent to motor 110. Readings may include one or more of VSD 300 output variables, such as voltage, frequency, current along ESP power cable 130, as well as variables taken from sensors 120 (whether downhole or otherwise) and/or shaft sensor 190, such as motor current, motor speed and/or discharge pressure. Collected information may be transmitted to VSD controller 305 with power cable 130 and/or with other data transmission cables and/or wires. The measurement(s) taken during initialization step 210 may be used to compile an initial data set of variables of interest. During initialization step 210, the data may be consolidated, assembled, stored in a spreadsheet, data structure, or database and/or combined to form a set of data indicative of the horsepower of ESP motor 110 at an initial or first voltage output from VSD 300, as well as pump performance data associated with the initial voltage setting. In some embodiments, this may include direct measurements of VSD output voltage, power cable 130 current, and/or motor 110 revolution rate. In other embodiments, desired information may be calculated and/or extrapolated from measured data during initialization step 210. Initialization values may be collected for a set period of time, such as for thirty seconds, one minute or ten minutes.

After the initial data set has been established at initialization step 210, the voltage output from VSD 300 to motor 110 may be adjusted by making a first voltage adjustment of a first type, at adjustment step 220. First adjustment step 220 may include either one of increasing or decreasing the output voltage of VSD system 150. Whether the voltage is increased or decreased at voltage adjustment step 220 may be selected randomly, pseudo-randomly, or controller 305 may be programmed to initially start with an increase, or initially start with a decrease. During voltage adjustment step 220, voltage may for example be increased or decreased at an increment of 0.5 Volts, 5.0 Volts, 20.0 Volts, or another similar voltage increment, or at an increment of between 0.5 Volts and 20.0 Volts, in increments of between 10.0 Volts and 50.0 Volts, or another similar increment range. Voltage step sizes may be made at adjustable increments and/or the increments may become smaller as the algorithm closes in on the optimal current and/or power setting of ESP motor 110.

In some embodiments, voltage may be adjusted without directly modifying the frequency and/or without regard to whether the Volts/Hz ratio changes. In certain embodiments, voltages may be adjusted while maintaining the Volts/Hz ratio. In either case, changes to the voltage may have the effect of altering pump performance.

By changing the output voltage of VSD 300 during adjustment step 220, certain variables of ESP pump 195 and/or motor 110 may correspondingly change. During sensing step 230, the same variables measured at initialization step 210 may be re-measured. Sensing step 230 may allow data collection of variables that may have changed as a result of the voltage adjustment at adjustment step 220 and/or may include information otherwise of interest. For example, an change in the VSD 300 output voltage during first adjustment step 220 may result in a faster or slower revolution rate of motor shaft 180, which revolution rate may be measured by shaft sensor 190 and/or downhole gauges 120, and the information transmitted to controller 305 during sensing step 230. During sensing step 230, data may be collected for a set period of time, such as for five seconds, thirty seconds or two minutes and/or may be collected until the pump performance variables reach equilibrium. The information collected during sensing step 230 may be assembled, calculated, stored in a spreadsheet, data structure, or database and/or combined in order to create a second data set during adjusted data set establishment step 240.

At differencing step 250, in the first iteration, the initial data set from initialization step 210 may be compared to the adjusted data set from step 240 by controller 305. The adjusted data set may also be compared to threshold boundary values input and/or stored such as minimum and/or maximum allowable head, flow rate and/or revolution rate. In subsequent iterations, the most recent data set may be compared to the immediately previously collected (next most recent) dataset. The data sets may be used in differencing step 250 to determine the type of adjustment (either an increase or decrease in voltage) that should be applied during subsequent voltage adjustment step 260. Subsequent voltage adjustment step 260 may result in increased, constant (negligibly changed) or decreased horsepower of motor 110. In one example, adjustment step 220 may include increasing the output voltage of VSD 300. This change may lead to a drop in current while motor 110 revolution rate is maintained, which may be indicative of a better voltage setting to move towards the best efficiency point (BEP) of motor 110. In some embodiments, discharge pressure and/or intake pressure may be used with or instead of motor revolution rate to identify a change in motor 110 horsepower corresponding with the voltage adjustment.

At differencing step 250, the computer-implemented software of controller 305 may implement an inquiry and resulting determination in a dynamic negative feedback loop according to the following algorithm:

(1) If current has dropped and pump performance is maintained between upper and lower thresholds, further adjust motor voltage in the same direction as the direction selected in the most recent previous adjustment to further optimize power of motor 110; or (2) If current rises and pump performance is maintained between upper and lower thresholds then dynamically re-adjust motor voltage in the opposite direction as the direction selected in the most recent previous adjustment to optimize power of motor 110; or (3) If current drops and pump performance is not maintained between (moves outside of) a threshold boundary, then dynamically re-adjust motor voltage in the opposite direction as the direction selected in the most recent previous adjustment to optimize power of motor 110.

As those of skill in the art will appreciate, for purposes of the loop algorithm of illustrative embodiments, the second data set may be compared to the initial data set, the third data set compared to the second data set, the fourth data set compared to the third, and so forth.

A current (e.g., amperage) delta large enough to be considered a significant rise or drop by the algorithm of illustrative embodiment may be a user-defined parameter based on a convergence threshold of a goal seeking algorithm. The algorithm of illustrative embodiments may seek to find a minimum current at which pump performance is not adversely affected and converge on such threshold.

Pump performance may be ascertained through one or more of revolution rate of the ESP motor 110, for example as in revolutions per minute (rpm) or another similar measurement of the revolution rate of ESP motor shaft 180, discharge pressure of ESP pump 195 and/or intake pressure of the ESP pump 195. Where revolution rate of the ESP motor 110 and/or motor shaft 180 data is used in the algorithm loop of illustrative embodiments, pump performance may be determined to be maintained where the change in shaft speed is within the minimum accuracy of the speed sensor. Revolution rate may also be used in conjunction with discharge pressure to determine a revolution rate delta where a change in discharge pressure is observed or otherwise becomes significant. In some embodiments, upper and lower thresholds for revolution rate when used as a metric for pump performance may be user-entered values.

Pump performance measured using discharge pressure and/or intake pressure may be application dependent based on the particulars of ESP string 100, well depth, and the type of pump 195 employed in the ESP string 100. Each ESP assembly 100 may include upper and lower flow rate limits based on the pump curve that may be optimized, as well as upper and lower allowable values for discharge pressure (head). For example, discharge pressure limits may be employed in conjunction with the head-flow curve of pump 195 to form a closed shape on a section of the pump curve within which to optimize. This information may be employed to calculate upper and lower thresholds using the pump curve and application specific values such as intake pressure to determine a range bound by upper and lower thresholds (boundaries) that define whether pump performance is maintained for the particular ESP application and assembly. Upper and lower discharge pressure may be definable parameters in user interface 160. If no head flow curve is available, flow boundaries may be employed in conjunction with discharge pressure to obtain upper and lower thresholds.

In some embodiments one or more of the following may be employed to define upper and lower threshold boundaries determinative of whether or not pump performance is maintained for purposes of the algorithm and/or loop of illustrative embodiments: a set of user defined and/or computed parameters and thresholds including discharge pressure boundaries (based on desired system performance), flow rate boundaries (based on desired system performance), shaft speed change limitations (based on measurement accuracy or user-defined), and intake pressure boundaries (based on reservoir or well constraints) which are used to constrain the optimization algorithm. These parameters may be defined in user-interface 160 and/or controller 305.

After the type of adjustment (increase or decrease) resulting in motor power optimization has been determined according to the software algorithm set forth in differencing step 250, the output voltage of VSD 300 may be changed during voltage change step 260 in the direction indicated by the algorithm of differencing step 250. The type of voltage adjustment, whether an increase or a decrease, during voltage change step 260 may be determined by following the algorithm of differencing step 250 such that the selected adjustment results and/or moves towards minimization and/or optimization of power sent to motor 110 at the required (or desired) motor 110 speed. After voltage change step 260 has been completed, if motor operation is continued at inquiry 265, then controller 305 may return to sensing step 230 and repeat steps 230-260 as described herein for the duration of operation of motor 110. At each iteration, the adjusted data set obtained at step 240 may be compared to the most recent previous data set during differencing step 250. The method of illustrative embodiments may be repeated iteratively such that voltage change step 260 is followed successively by sensing step 230, such that each successive voltage adjustment is followed by a determination of the values of variables that have been modified as a result of the voltage adjustment, such as revolution rate, discharge pressure and/or current (e.g., motor current or current along power cable 130). In this way, each iteration is performed by comparing the current data set to the previous data set. For example, steps 230 through 260 may be performed repeatedly such that the initial data set is compared to a second data set, which second data set is then compared to a third data set, and so on. In this way, motor 110 power may be continuously optimized throughout operation of motor 110 to find the optimal operating voltage for motor 110 despite changing motor temperatures and environmental conditions and significant and/or varying resistance along power cable 130. In some embodiments, controller 305 may cease implementation after a predetermined number of iterations and/or may reduce the frequency of iterations if changes between subsequent data sets become insignificant.

If at inquiry 265, motor 110 and/or VSD 300 is paused or turned off, or an operator intervenes to end iterations and/or the dynamic loop, then motor 110 operation and/or the loop may be completed at completion step 270 having operated with an improved power efficiency and operation of motor 110.

The data included in first, second and subsequent data sets may be measured directly or may be inferred, calculated, and/or extrapolated from other measured data. In one example, the downhole measurements may include shaft 190 revolution rate for motor 110 during operation. In such an example, the revolutions rate of motor shaft 180 may be measured during initialization step 210 and sensing step 230 by using motor sensors 120 to measure the magnetic flux that results from movement of magnet 190 attached to motor shaft 180. Controller 305 may then store and/or calculate the speed and/or horsepower of motor 110. In some embodiments, the voltage, current, frequency, and/or power losses along the power cable may be provided to or calculated by controller 305. For example, the VSD output voltage and current may be used to calculate the extent to which power is lost or dissipated along the length of power cable 130 and/or ammeter 330 (shown in FIG. 3) may measure current along cable 130 at various locations along the long cable 130, which may be up to a few thousand feet in length. A pump head-flow curve and other similar data may also be stored.

In some embodiments, voltage change step 260 may occur every five seconds, every ten seconds, every thirty seconds, in a range between every five seconds and every thirty seconds, and/or in a range between every five seconds and every two minutes, or another similar range. The period of time between adjustments may depend upon the length of time needed for the particular ESP string 100 to reach equilibrium, and an ESP pump 195 may take between a few seconds to a few minutes to come to equilibrium after a change in operating state. The time between voltages changes and/or adjustments may be set by an operator through user interface 160 or determined dynamically by the algorithm.

The algorithm of illustrative embodiments may be implemented as part of the proportional-integral-derivative (PID) control algorithm or may be implemented separately from PID controls. Illustrative embodiments may be implemented in its own power optimization mode and/or may be a subroutine in another control mode such as PID.

Figure 3:
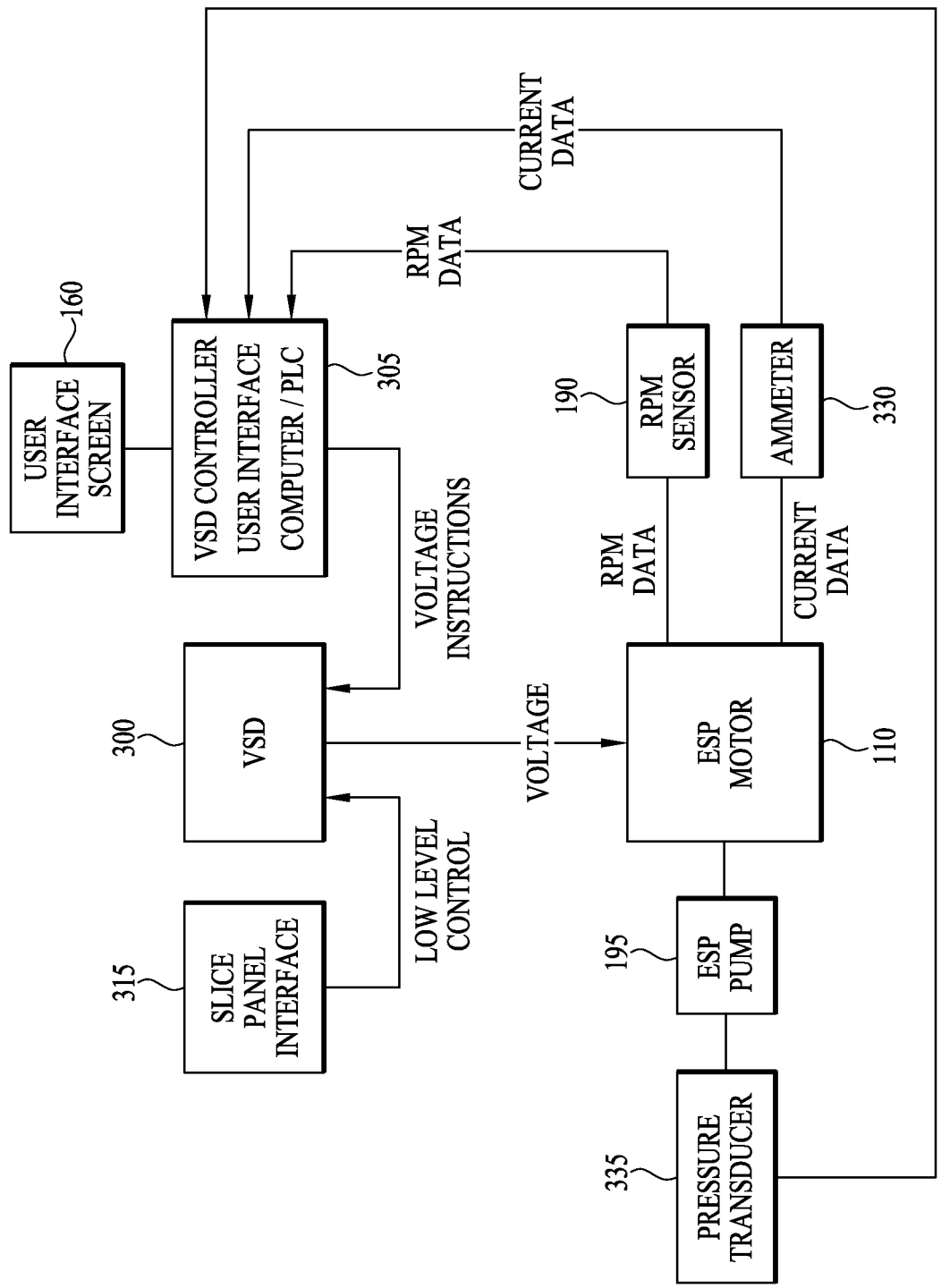
FIG. 3 is a data flow diagram of a power optimization system of illustrative embodiments for an exemplary electric submersible motor.

FIG. 3 illustrates a data flow diagram of a power optimization system of illustrative embodiments. VSD 300 may provide voltage to ESP motor 110. The magnitude of voltage sent from VSD 300 to ESP motor 110 may be instructed by controller 305. Voltage provided to ESP motor 110 may affect the revolution rate (or horsepower) and/or current of ESP motor. The revolution rate may be measured by gauges such as magnet 190 and/or downhole sensors 120, and this data may be sent to controller 305 for storage and/or inclusion in the data sets of illustrative embodiments. Similarly ammeter 330 or other sensors 120 may send information on the current of motor 110 to VSD controller 305 and/or one or more pressure transducers 335 may send discharge and/or intake pressure data to VSD controller 305. Once the voltage output has been adjusted, controller 305 may then compare the new data compiled to the previous data set, and change the voltage instructions to VSD 300 in accordance with the algorithm of illustrative embodiments described herein. Controller 305 may also create and store a log of actions taken by the software of controller 305 so that an operator can review the actions taken by controller 305 and/or the data collected, for example through user interface 160. Those of skill in the art will appreciate that if other variables are measured (such as discharge pressure rather than current), or if variables such as current are measured at another location (such as at an intermediate section of power cable 130), then the position of sensors 120 may be adjusted accordingly, such as to the pump 195 discharge, so that the desired data may be obtained.

A dynamic power optimization system and method for electric submersible motors has been described. Illustrative embodiments may improve a VSD controller computer and/or improve operation of an ESP motor by providing capabilities to optimize the power consumption of an electric submersible motor throughout its operating life while maintaining pump performance, which may power usage efficiency and may provide a more environmentally friendly or "green" ESP motor. Illustrative embodiments may allow an electric submersible motor to optimize power usage during operation despite changing environmental and/or operational conditions, such as temperature and/or well composition. Illustrative embodiments may reduce the operating costs of a project by continuously and dynamically minimizing the power consumed by the ESP system, while preventing the need to shut down the ESP motor in order to do so. Illustrative embodiments may provide a method for receiving, analyzing, calculating, differencing and/or combining measurements (data) of variables indicative of power use, which may originate from downhole sensors, surface sensors, a VSD system, user inputs, or a combination of those. Illustrative embodiments may include employing such analyzed data to determine a direction in which to move voltage output sent to the ESP motor in order to minimize and/or optimize the power consumption of the system. Illustrative embodiments may adjust VSD output voltage in such a direction determined by the software program of illustrative embodiments that results in power optimization of the VSD, the submersible motor, and/or the ESP assembly.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope and range of equivalents as described in the following claims. In addition, it is to be understood that features described herein independently may, in certain embodiments, be combined.

The invention claimed is:

1. A method comprising:
operating an electric submersible pump (ESP) motor downhole in a well, the ESP motor electrically connected to a variable speed drive (VSD) proximate to the well,
wherein the operating comprises, measuring a revolution rate and a motor current of the ESP motor for a first period of time;
performing a first adjustment of a voltage output of the VSD;
measuring, after the first adjustment, the revolution rate and the motor current of the ESP motor for a second period of time;
determining a difference between the motor current measured for the first period of time and the motor current measured for the second period of time; and
performing a second adjustment of the voltage output of the VSD based on a change in the revolution rate and the motor current between the first period of time and the second period of time.

2. The method of claim 1, wherein performing the second adjustment comprises,
performing a first adjustment type that comprises increasing or decreasing the voltage output in response to a drop in the motor current between the first period of time and the second period of time.

3. The method of claim 2, wherein performing the second adjustment comprises performing the first adjustment type in response to the revolution rate being maintained between an upper threshold and a lower threshold for the second period of time.

4. The method of claim 2, wherein performing the second adjustment comprises performing an adjustment type that is opposite of the first adjustment type in response to,
a change in the motor current between the first period of time and the second period of time is an increase and
the revolution rate being maintained between an upper threshold and a lower threshold for the second period of time.

5. The method of claim 2, wherein performing the second adjustment comprises performing an adjustment type that is opposite of the first adjustment type in response to,
a change in the motor current between the first period of time and the second period of time is a decrease and
the revolution rate for the second period of time deviating above an upper threshold or below a lower threshold.

6. The method of claim 1,
wherein measuring the revolution rate of the ESP motor comprises measuring a magnetic flux of a shaft of the motor as the shaft rotates,
wherein the magnetic flux of the shaft is measured using a downhole sensor coupled below the motor, and
wherein the downhole sensor is to measure the magnetic flux of a magnet attached to the shaft.

7. The method of claim 1, further comprising calculating a power usage of the ESP motor from the measured motor current and the voltage output to the motor and logging the power usage.

8. A non-transitory computer-readable medium having instructions stored thereon that are executable by a processor to perform operations comprising:
operating an electric submersible pump (ESP) motor downhole in a well, the ESP motor electrically connected to a variable speed drive (VSD) proximate to the well,
wherein the operating comprises, measuring a revolution rate and a motor current of the ESP motor for a first period of time;
performing a first adjustment of a voltage output of the VSD;
measuring, after the first adjustment, the revolution rate and the motor current of the ESP motor for a second period of time;
determining a difference between the motor current measured for the first period of time and the motor current measured for the second period of time; and
performing a second adjustment of the voltage output of the VSD based on a change in the revolution rate and the motor current between the first period of time and the second period of time.

9. The non-transitory computer-readable medium of claim 8, wherein performing the second adjustment comprises,
performing a first adjustment type that comprises increasing or decreasing the voltage output in response to a drop in the motor current between the first period of time and the second period of time.

10. The non-transitory computer-readable medium of claim 9, wherein performing the second adjustment comprises performing the first adjustment type in response to the revolution rate being maintained between an upper threshold and a lower threshold for the second period of time.

11. The non-transitory computer-readable medium of claim 9, wherein performing the second adjustment comprises performing an adjustment type that is opposite of the first adjustment type in response to,
a change in the motor current between the first period of time and the second period of time is an increase and
the revolution rate being maintained between an upper threshold and a lower threshold for the second period of time.

12. The non-transitory computer-readable medium of claim 9, wherein performing the second adjustment comprises performing an adjustment type that is opposite of the first adjustment type in response to,
a change in the motor current between the first period of time and the second period of time is a decrease and
the revolution rate for the second period of time deviating above an upper threshold or below a lower threshold.

13. The non-transitory computer-readable medium of claim 8,
wherein measuring the revolution rate of the ESP motor comprises measuring a magnetic flux of a shaft of the motor as the shaft rotates,
wherein the magnetic flux of the shaft is measured using a downhole sensor coupled below the motor, and
wherein the downhole sensor is to measure the magnetic flux of a magnet attached to the shaft.

14. The non-transitory computer-readable medium of claim 8, further comprising calculating a power usage of the ESP motor from the measured motor current and the voltage output to the motor and logging the power usage.

15. A system comprising:

an electric submersible pump (ESP) motor;

a variable speed drive (VSD) to output voltage to the ESP motor;

a processor; and a non-transitory computer-readable medium having instructions stored thereon that are executable by the processor to perform operations comprising:

operating the ESP motor downhole in a well based on the output voltage from the VSD, wherein the operating comprises, measuring a revolution rate and a motor current of the ESP motor for a first period of time;

performing a first adjustment of the output voltage of the VSD;

measuring, after the first adjustment, the revolution rate and the motor current of the ESP motor for a second period of time;

determining a difference between the motor current measured for the first period of time and the motor current measured for the second period of time; and performing a second adjustment of the output voltage of the VSD based on a change in the revolution rate and the motor current between the first period of time and the second period of time.

16. The system of claim 15, wherein performing the second adjustment comprises, performing a first adjustment type that comprises increasing or decreasing the output voltage in response to a drop in the motor current between the first period of time and the second period of time.

17. The system of claim 16, wherein performing the second adjustment comprises performing the first adjustment type in response to the revolution rate being maintained between an upper threshold and a lower threshold for the second period of time.

18. The system of claim 16, wherein performing the second adjustment comprises performing an adjustment type that is opposite of the first adjustment type in response to, a change in the motor current between the first period of time and the second period of time is an increase and the revolution rate being maintained between an upper threshold and a lower threshold for the second period of time.

19. The system of claim 16, wherein performing the second adjustment comprises performing an adjustment type that is opposite of the first adjustment type in response to, a change in the motor current between the first period of time and the second period of time is a decrease and the revolution rate for the second period of time deviating above an upper threshold or below a lower threshold.

20. The system of claim 15, wherein measuring the revolution rate of the ESP motor comprises measuring a magnetic flux of a shaft of the motor as the shaft rotates, wherein the magnetic flux of the shaft is measured using a downhole sensor coupled below the motor, and wherein the downhole sensor is to measure the magnetic flux of a magnet attached to the shaft.

* * * * *